UNITED STATES PATENT OFFICE 2,275,661

WAX EXTRACTION

John Vernon Steinle and Elbert S. McLoud, Racine, Wis., assignors to S. C. Johnson & Son, Inc., Racine, Wis., a corporation of Wisconsin No Drawing. Application July 17, 1939,
Serial No. 284,885

9 Claims. (Cl. 210—150.5)

This invention relates to a process for manufacturing wax from crude wax powder, more specifically, it relates to a process for manufacturing a light colored raw material wax which utilizes a rapid extraction of the wax from the crude powder.

Many vegetable waxes are or readily can be obtained from their plant sources in the form of a powder. This crude powder contains varying amounts of non-waxy material depending on the particular wax and the manner in which it is removed from the plant.

The solid raw material wax heretofore obtained from this crude powder by means of the various processes employed therefor is highly colored and contains, in addition to such coloring material, certain resinous and other non-waxy matter. Purification of this raw material wax is necessary for most commercial requirements primarily for the purpose of decreasing the coloration, but also, in some instances, for the purpose of removing the harmful non-waxy matter.

In this description and in the following claims, we use the term "wax powder" to identify the powdery substance which is removed as such from the vegetable matter and which is composed of both wax and non-waxy particles. The term "crude powder" refers to the wax powder prior to any removal of the non-waxy material, and the term "raw material wax" refers to the solid wax which is manufactured from the wax powder.

In order to more fully set forth the nature of the problems here solved, it may be desirable to illustrate the prior process for manufacturing wax from crude powder with the commercially available carnauba wax. This wax is obtained in the form of a crude powder by manually beating the cut and thoroughly dried brittle suspended carnauba palm leaves to remove the fine crystalline-like flaky wax particles enclosed within the crevices of the shrunken leaves. The powder gathers on the floor and contains a great deal of leafy matter which, together with the other non-waxy matter present, may equal as much as 20% of the total mass. A large portion of this leafy matter is in the form of a powder composed of particles comparable in size, shape and mass to those of the wax particles.

Carnauba wax has been manufactured from this crude powder for over a century by the somewhat primitive process of heating the powder containing the non-waxy matter to a temperature above the melting point of the wax and straining the molten mixture through a cloth to remove the leafy matter and other insoluble solid material. The cooled filtrate forms the dark green, greenish-brown or brownish-black raw material wax of commerce and comprises over 90% of the annual carnauba wax supply.

Some light yellow colored carnauba wax is manufactured from powder which is obtained from the young unopened leaves termed "olhos." Although the composition and color of this wax is highly desired, its supply is very limited.

It has heretofore been thought that the difference in color between the wax obtained from the unopened leaves or "olhos" as compared with the wax obtained from the opened leaves or "palhas" was dependent on the age of the leaf and that therefore the age of the wax on the leaf was a factor of the color of the wax obtained therefrom. However, we have discovered by experimentation that the wax formed by melting the very small pure wax particles obtained from the young or old leaves is practically colorless and that the greatly differing color of the raw material wax which is prepared from the crude powder obtained from these different leaves must be introduced during the manufacture of the raw material wax. Following this line of reasoning, we further discovered that the coloration is introduced during the melting of the crude wax powder. Part of this coloration is obtained from sources other than the leafy matter, such as sand, clay, dirt and humus material, but this coloration can readily be satisfactorily removed from the wax cake by means of subsequent remelting and filtration. The leafy matter, however, contains difficultly removable high coloring substances, such as chlorophyll and xanthophyll, which, together with their decomposition products and the decomposition products of other color-forming substances, are extracted by the hot molten wax to form the greater part of the undesirable deep coloration of the crude raw material wax cakes. This coloration is thereby so thoroughly incorporated within the wax that its subsequent complete removal has not been attained by any known process whereby the product produced retains the components of the original wax unchanged.

The unopened yellow "olhos" leaves therefore produce the yellow colored wax because the leafy material in the crude powder obtained therefrom contains no chlorophyll or other deep coloring substances incident to the more mature open leaves and the hot molten wax extracts only the light yellow coloration composed largely of carotin. Crude powder which is obtained from the green opened "palhas" leaves contains the fine leafy matter beaten from these leaves whereby the deep coloring substances, such as cholorphyll and xanthophyll, are introduced into the powder and are subsequently extracted by the hot molten wax to form the deep-coloration of the raw material wax cakes.

Methods other than the above melting process have been proposed to manufacture the solid wax from its crude powder. Thus, the ordinary solvent extraction process proposed for obtaining candelilla wax from the plant might well be applied to a crude powder. These prior extraction processes, also yield highly colored wax products which contain large amounts of resinous matter because the extractant is allowed to remain in contact with the vegetable matter for a period of time sufficiently long to extract the coloring and resinous matter as well as the wax.

A principal object therefore of our invention is to obtain a raw material wax of satisfactory lightness of color. Another object is to obtain a raw material wax which is of uniform composition composed of the unaltered original wax components. It is still another object of our invention to provide means for extracting substantially pure wax from wax powder. Still another object of our invention is to manufacture a light colored raw material wax using the wax powder as the initial material.

Contrary to the teachings of the prior art, we have discovered that the coloration of wax is not dependent on the living leaves or the age thereof; that the coloration is incorporated into the wax during the initial melting of the crude powder; that the source of the coloration is the fine powdery leafy material; and that substantially pure wax can be extracted from the wax powder.

Our process comprises the removal of the wax from the crude wax powder by the means of solvent extraction without thereby removing any appreciable amount of the resinous matter, chlorophyll, or other coloring and color-forming substances. This removal is accomplished by virtue of the fact that the coloring and resinous substances are enclosed within the vegetable tissue of the leafy matter whereas the wax is in the form of free minute flaky crystalline-like particles of pure wax. Since the wax is in ideal form for rapid solution, we add the extractant at or near its boiling temperature to the crude wax powder with active stirring and filter the resulting slurry immediately. Immediate filtration removes the hot solvent before any appreciable quantities of coloring or resinous substances can be extracted from the leafy matter.

The wax, however, being in said ideal form for rapid solution, dissolves immediately and approximately 80 to 90% of it is removed with the solvent by filtration. The extraction solvent is distilled and the molten wax residue, upon cooling, yields a substantially resin-free wax of satisfactory lightness of color which contains the essential constituents of the original wax unchanged.

In our rapid extraction process, the yield approaches 100% and may be reduced to 80% or less depending upon the various factors herein set forth and on the desired color improvement of the final product which varies inversely as compared with the percentage yield. The reduction of the yield is caused by the fact that the extraction solvent is allowed to remain in contact with the wax powder for only that brief period required to add the solvent and immediately filter the resulting slurry. The wax obtained in an 80% yield is of excellent quality and the remaining 20% may readily be recovered from the filter cake by means of ordinary slow extraction processes.

The solvents which lend themselves to our rapid solution process are the better wax solvents familiar in the art. The preferred solvents are the coal tar solvents, such as benzene or toluene, and the chlorinated solvents, such as carbon tetrachloride, ethylene dichloride and chloroform. Solvents which may also be used are the lower-boiling short-range naphthas (100–200° C.), ethyl acetate and amyl or butyl alcohol. The efficiency of the process depends on the degree of solubility of the wax in the particular solvent, upon the time during which the solvent remains in contact with the crude powder and upon the amount of leafy vegetable matter present in the crude powder. The time during which the powder is in contact with the solvent is limited only by the speed of filtration. Speed of the filtration may be increased and the possibilities of extracting coloring matter decreased if a substantial portion of the leafy material is first removed from the crude wax powder prior to the extraction process. This separation may take the form of the mechanical separation of the leafy material and other non-waxy matter by means of screening separations, by means of centrifugal air flotation separations, or by a combination of both screening and air flotation separation as described in the application on wax powder refining filed on even date herewith.

In our process, we add the hot extraction solvent to the crude wax powder and filter the resulting slurry immediately. The dissolved wax is recovered from the solution upon removing the solvent by distillation. Further improvement is obtained when an adsorbent is added to the solvent containing the dissolved wax before the solvent is evaporated. The traces of coloring and resinous matter which may have been extracted with the wax are thereby removed by the adsorbent rather than allowed to be incorporated within the wax during the solvent distillation. After distillation the molten wax residue is filtered to remove the adsorbent, and the filtrate, upon cooling, forms very light colored substantially resin-free wax cakes composed of the unaltered essential constituents of the original wax.

The raw material wax produced according to this invention contains a very slight trace of the extraction solvent. For those commercial uses of the wax wherein this trace of solvent may be a hindrance, it is desirable to remove this solvent by adding a suitable adsorbent to the molten wax after the last filtration in the above process. The molten wax is then refiltered and allowed to cool. Suitable adsorbents for use with wax in the molten or dissolved state are the adsorbent clays and carbons heretofore employed in the purification of waxes.

*Example 1*

One hundred pounds of crude carnauba wax powder is placed in a kettle. Fifty gallons of toluene at a temperature near boiling is then added thereto with active stirring. The mixture is immediately filtered to remove the leafy material and other insoluble solid impurities, and the filtrate is evaporated by distillation. The molten wax residue, upon cooling, forms carnauba wax cakes of satisfactory lightness of color composed of the chemically and structurally unaltered original essential wax components.

Example 2

One hundred and twenty pounds of crude carnauba wax powder is screened successively through a screen of about 30 mesh per inch and another of about 60 mesh per inch and the fines of such screening operation are subjected to a centrifugal air flotation separation in a Raymond centrifugal air flotation separator having two or more banks of whizzer blades. The resulting purified wax powder is treated as in Example 1.

Example 3

One hundred and twenty pounds of crude carnauba wax powder is treated for purification as in Example 2. The resulting refined wax powder is mixed with 50 gallons of hot toluene and the slurry so formed is immediately filtered. Approximately 5 pounds of a suitable adsorbent is added to the filtrate which is then distilled to remove the solvent. The molten wax residue from the distillation is filtered to remove the adsorbent and the filtrate of molten wax is further purified to remove the small trace of solvent contained therein by adding a suitable adsorbent. The molten mixture is again filtered and the filtrate, upon cooling, forms substantially resin-free wax cakes of excellent color and quality.

We have used carnauba wax to illustrate and explain the nature of the coloration of a raw material vegetable wax obtained from a crude powder; to further illustrate and more specifically point out the nature of the problems here solved; and, as an example to set forth several forms in which our process may be employed; we do not thereby intend to limit the application of our process to the production of carnauba wax. Our process may be applied to any vegetable wax which is obtained from the plants in the form of a wax powder.

It is evident that our process offers many advantages over prior methods for manufacturing raw material wax from crude wax powder. It is highly flexible and may be carried out in many ways without departing from the spirit or scope of our invention which is not to be regarded by the details of operation or by the theories advanced in the explanation of the improved results obtained, but only by the terms of the accompanying claims in which it is our intention to claim all novelty inherent therein as broadly as possible in view of the prior art.

Having thus described the invention, what we claim as new and desire to secure by Letters Patent of the United States, is:

1. In the manufacture of wax from vegetable wax powder which has not been melted in the production thereof, the process which comprises adding a hot solvent for wax to the said wax powder, immediately thereafter passing the dissolved wax and solvent through a filter adapted for rapid filtration, and removing the solvent in the filtrate to recover the dissolved wax.

2. In the manufacture of wax from vegetable wax powder which has not been melted in the production thereof, the process which comprises adding a hot solvent for wax to the said wax powder, immediately thereafter passing the dissolved wax and solvent through a filter adapted for rapid filtration, adding to the filtrate a solid adsorbent adapted to adsorb chlorophyl and other like coloring matter, removing the solvent therefrom by distillation, and filtering the molten wax residue to remove the adsorbent.

3. In the manufacture of wax from vegetable wax powder which has not been melted in the production thereof, the process which comprises adding a hot solvent for wax to the said wax powder, immediately thereafter passing the dissolved wax and solvent through a filter adapted for rapid filtration, removing the solvent from the filtrate by distillation, adding a solid adsorbent which is adapted to adsorb chlorophyl to the molten wax residue after the solvent has been removed therefrom, and filtering said molten wax to remove the adsorbent.

4. In the manufacture of wax from crude vegetable wax powder, which has not been melted in the production thereof, the process which comprises subjecting the crude powder to a centrifugal air flotation separation adapted to remove therefrom fine leafy material of the size and weight of the wax particles, adding a hot solvent for wax to the refined powder which is carried from the separator by the air current, immediately and rapidly filtering the resulting slurry, and removing the solvent from the filtrate by distillation to recover the dissolved wax.

5. In the manufacture of wax from crude vegetable wax powder, which has not been melted in the production thereof, the process which comprises screening the crude powder through one or more screens of from 20 to about 60 mesh per inch, subjecting the screened powder to a centrifugal air flotation separation adapted to remove therefrom fine leafy material of about the same size and mass of the wax particles, adding a hot solvent for wax to the refined powder, immediately and rapidly filtering the resulting slurry, adding to the filtrate a solid adsorbent adapted to adsorb chlorophyl and like coloring material, and removing the solvent therefrom by distillation and the adsorbent thereafter by filtration.

6. In the manufacture of carnauba wax from its powder which has not been melted in the production thereof, the process which comprises adding a hot solvent for wax to the crude carnauba powder, immediately thereafter passing the dissolved wax and solvent through a filter adapted for rapid filtration, adding to the filtrate a solid adsorbent adapted to adsorb chlorophyl and like coloring matter, and removing first the solvent therefrom by evaporation and the adsorbent thereafter by filtration.

7. In the manufacture of wax from crude carnauba wax powder, which has not been melted in the production thereof, the process which comprises screening the crude carnauba powder through screens adapted to remove fine leafy material, adding a suitable hot solvent for wax to the fines of the screening operation, immediately and rapidly filtering the resulting slurry, evaporating the solvent in the filtrate, adding a solid adsorbent, which is adapted to remove chlorophyl, to the molten wax residue and filtering to remove the adsorbent.

8. In the manufacture of carnauba wax from its crude powder, which has not been melted in the production thereof, the process which comprises screening the crude powder through one or more screens adapted to remove fine leafy material, subjecting the screened powder to a centrifugal air flotation separation adapted to remove therefrom leafy matter of the same size and mass as the wax particles, adding a hot solvent for wax to the refined powder which is carried from the separator by the air current, immediately and rapidly filtering the resulting slurry, and removing the solvent from the filtrate by distillation.

9. In the manufacture of carnauba wax from its crude powder, which has not been melted in the production thereof, the process which comprises screening the crude powder through one or more screens adapted to remove fine leafy matter, subjecting the screened powder to a centrifugal air flotation separation adapted to remove therefrom leafy matter of the wax particle size and mass, adding a hot solvent for wax to the refined powder which is carried from the separator by the air current, immediately and rapidly filtering the resulting slurry, evaporating the solvent from the filtrate, adding to the molten wax residue a solid adsorbent, which is adapted to adsorb chlorophyl and like coloring matter, and filtering said residue to remove the adsorbent.

JOHN VERNON STEINLE.
ELBERT S. McLOUD.